US006250861B1

(12) United States Patent
Whitehead

(10) Patent No.: US 6,250,861 B1
(45) Date of Patent: Jun. 26, 2001

(54) SIDE RAIL FOR FLATBED TRAILERS AND TRUCKS

(76) Inventor: Jerald M. Whitehead, 12570 SR 21, Boise, ID (US) 83716

(*) Notice: Subject to any disclaimer, the term of this patent is extended or adjusted under 35 U.S.C. 154(b) by 0 days.

(21) Appl. No.: 09/384,131

(22) Filed: Aug. 27, 1999

(51) Int. Cl.[7] .......................................................... B60P 7/08
(52) U.S. Cl. ........................... 410/100; 410/103; 410/104
(58) Field of Search .................................. 410/8–12, 97, 410/100, 103–106; 296/43, 182; 254/213, 266, 222, 223, 323, 329; 24/68 CD, 265 CD; 248/499, 503

(56) References Cited

U.S. PATENT DOCUMENTS

| 3,295,464 | 1/1967 | Broling . | |
|---|---|---|---|
| 3,621,236 | 11/1971 | Hlinsky et al. . | |
| 3,633,937 | 1/1972 | Hlinsky . | |
| 3,697,045 | 10/1972 | Farley . | |
| 3,740,073 | 6/1973 | Schwiebert . | |
| 4,273,486 | 6/1981 | Tatina | 410/103 |
| 4,367,993 | * 1/1983 | Meigs | 410/103 |
| 4,382,736 | * 5/1983 | Thomas | 410/104 |
| 5,388,938 | * 2/1995 | Helton | 410/101 |
| 5,664,918 | * 9/1997 | Heider et al. | 410/103 |
| 5,860,777 | * 1/1999 | Walsh et al. | 410/100 |

FOREIGN PATENT DOCUMENTS 3618420  12/1987 (DE) .

OTHER PUBLICATIONS

Flatbed Products—Winches; PCC, pp. 4 and 5, 1984.

* cited by examiner

Primary Examiner—Stephen T. Gordon
(74) Attorney, Agent, or Firm—Christensen O'Connor Johnson Kindness PLLC

(57) ABSTRACT

A side rail (10) mounts on the load carrying deck of a transport vehicle to facilitate securing loads to the deck and includes an upright abutment wall (20) that intersects a support surface extension (30). The abutment wall 20 has an inner surface (22) that faces the load carrying deck and an outer surface (24) that faces away from the load carrying deck. An upwardly and outwardly angling winch mount (50) connects the outer surface (24) of the abutment wall (20) to the support surface extension (30). Upper and lower attachment flanges (26) and (28) project inwardly from the abutment wall (20) for mountably engaging the load carrying deck. The support surface extension (30) is bifurcated by a longitudinally disposed channel (32), creating an inner extension portion (36) and an outer extension portion (38). An outwardly disposed hook notched lip (42) is formed along the inner edge of the channel (32) to produce a chain tie-down securing location. Winch support hooks (52) and (54) formed on the lower surface of the winch mount (50), are configured to mount a winch type device at an angular orientation. A rubrail curtain securement flange (60) depends downwardly from the outer edge of the support surface extension (30) for securing and sealing tarps and side curtains (68) to the load carrying deck.

27 Claims, 3 Drawing Sheets

US 6,250,861 B1

SIDE RAIL FOR FLATBED TRAILERS AND TRUCKS

FIELD OF THE INVENTION

The present invention relates to a side rail for mounting on flatbeds of trucks and trailers and more particularly to a side rail that is used to facilitate securing loads on the flatbeds.

BACKGROUND OF THE INVENTION

It has long been common practice to transport loads on flatbed vehicles, such as trucks and trailers. These loads are secured to the vehicles using flexible tie-down elements, such as chains, cables and straps. The loads transported by these vehicles often vary widely in shape, size and weight. As a result, many different kinds of apparatus have been developed for tightening and securing tie-down elements to a vehicle deck.

These various apparatus typically either directly incorporate or provide a mounting mechanism for a winch or other rotational device for tightening a cable or strap placed over the load. Many of the conventional kinds of tightening and securing apparatus mount along the longitudinal edges of the transporting vehicle's flatbed deck. Since a variety of federal and state agencies have placed width and height restrictions on transport vehicles, it is advantageous for the winches associated with the securing devices to be directed vertically downward so that the winches do not contribute to the width of the flatbed decks. This allows useable deck space to be maximized. The vertical downward orientation of the winch also allows larger amounts of torque to be generated by the winch.

The problem with directing the securing devices downward is that such orientation often does not provide adequate clearance from the wheels of the transport vehicles and increases the height of the deck. Therefore, the securing devices are generally directed horizontally outward in the area of the flatbed vehicle's wheels and cannot slide longitudinally. As described above, this type of winch orientation reduces the amount of useable flatbed deck space and reduces the amount of torque that can be generated by the winch. There is a continuing need in the art for a flatbed vehicle securement device that allows useable flatbed deck space to be maximized while still providing adequate clearance over the wheels of the vehicle.

SUMMARY OF THE INVENTION

The present invention is directed towards a side rail apparatus for mounting on the load carrying deck of a transport vehicle to facilitate securing loads to the deck. The side rail contains a support surface extension that is configured to form additional support surface for carrying loads on the vehicle. A mounting portion is connected to the support surface extension and is configured to mate with the deck. A winch mount is secured to at least one of the support surface extension and the mounting portion. The winch mount is disposed at an angular orientation relative to the mounting portion and has portions engageable with a winch type device in order to mount the slidable winch type device at an acute angle relative to the mounting portion.

In a preferred embodiment of the present invention, the side rail apparatus further includes a chain securement tie-down in the shape of an outwardly disposed hook notched lip for selectively attaching a load securing member. The side rail also contains a rubrail curtain securement tie-down in the shape of a flange that depends downwardly from the support surface extension and is configured to be matable with a correspondingly shaped curtain fastener for selectively attaching a curtain type member. Both the chain securement tie-down and the rubrail curtain securement tie down are integrally built into the support surface extension. The mounting portion of the side rail is shaped and sized to mount on an edge of the load carrying deck and to be positionally adjustable along the edge of the load carrying deck. The winch mount diagonally intersects and is secured to both the support surface extension and the mounting portion. The winch mount further contains two parallel, spaced apart winch support hooks that are shaped and sized to slidably receive and support a slidably engageable winch type device such that the winch type device rotates in a plane perpendicular to the plane of the mounting portion.

A side rail apparatus constructed in accordance with the present invention provides greater clearance for a vehicle's tires, additional functional deck surface area, and integration of winch securement, curtain securement, and chain securement in a single device. The diagonal orientation of the winch mount and hence the mounted winch type device results in raising the bottom portion of the winch type device, thereby increasing the clearance between the winch type device and the vehicle wheels. Further, this is accomplished without increasing the effective width of the vehicle flatbed. The functional deck surface area provided by the side rail allows the original flatbed deck surface area to be narrower, thus reducing weight and increasing pay load. Finally, the integration of winch securement, load strap securement, curtain securement, and chain securement in a single device allows additional equipment to be eliminated.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
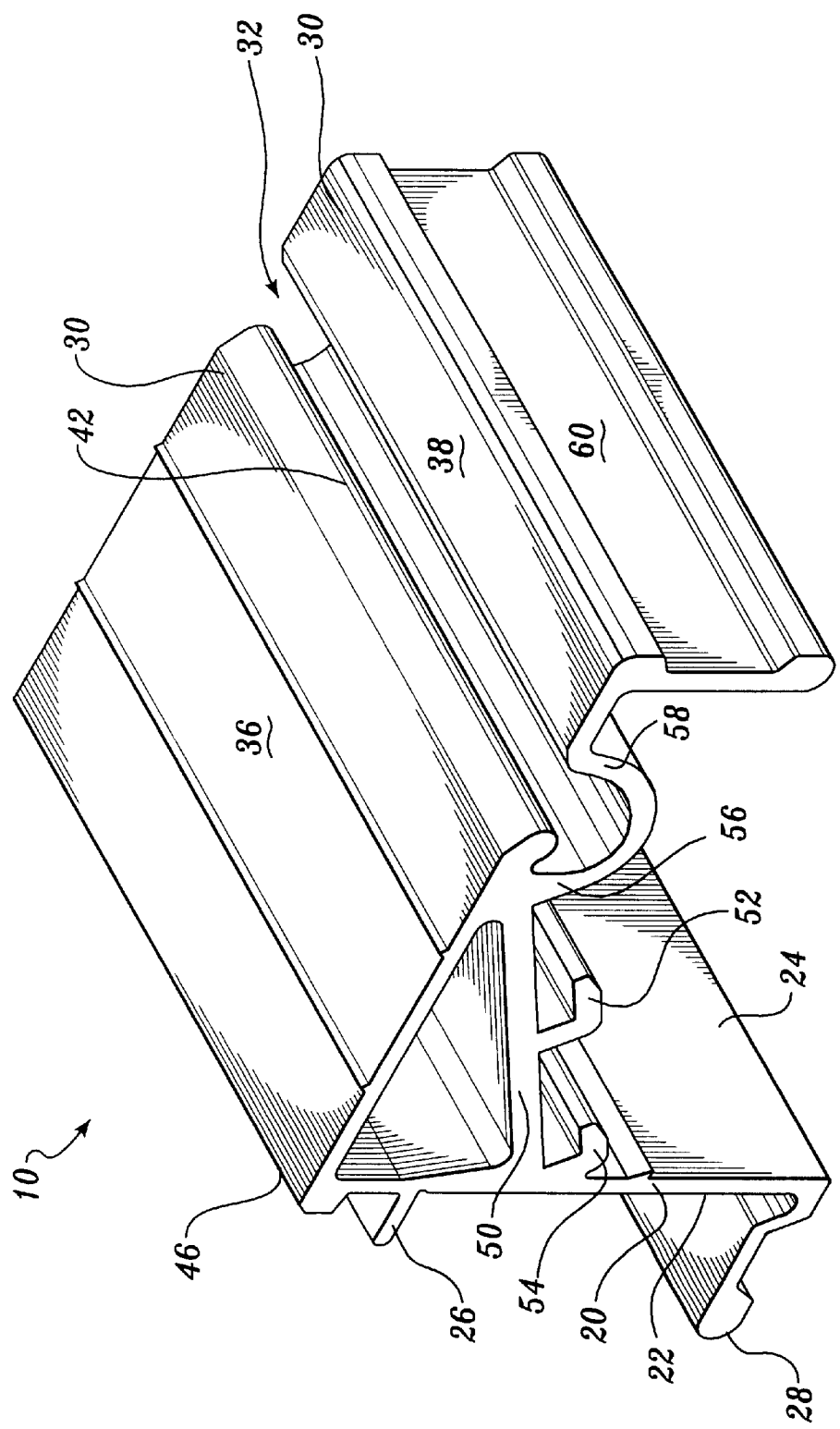
FIG. 1 illustrates a perspective view of a side rail apparatus constructed in accordance with the present invention.
Figure 2:
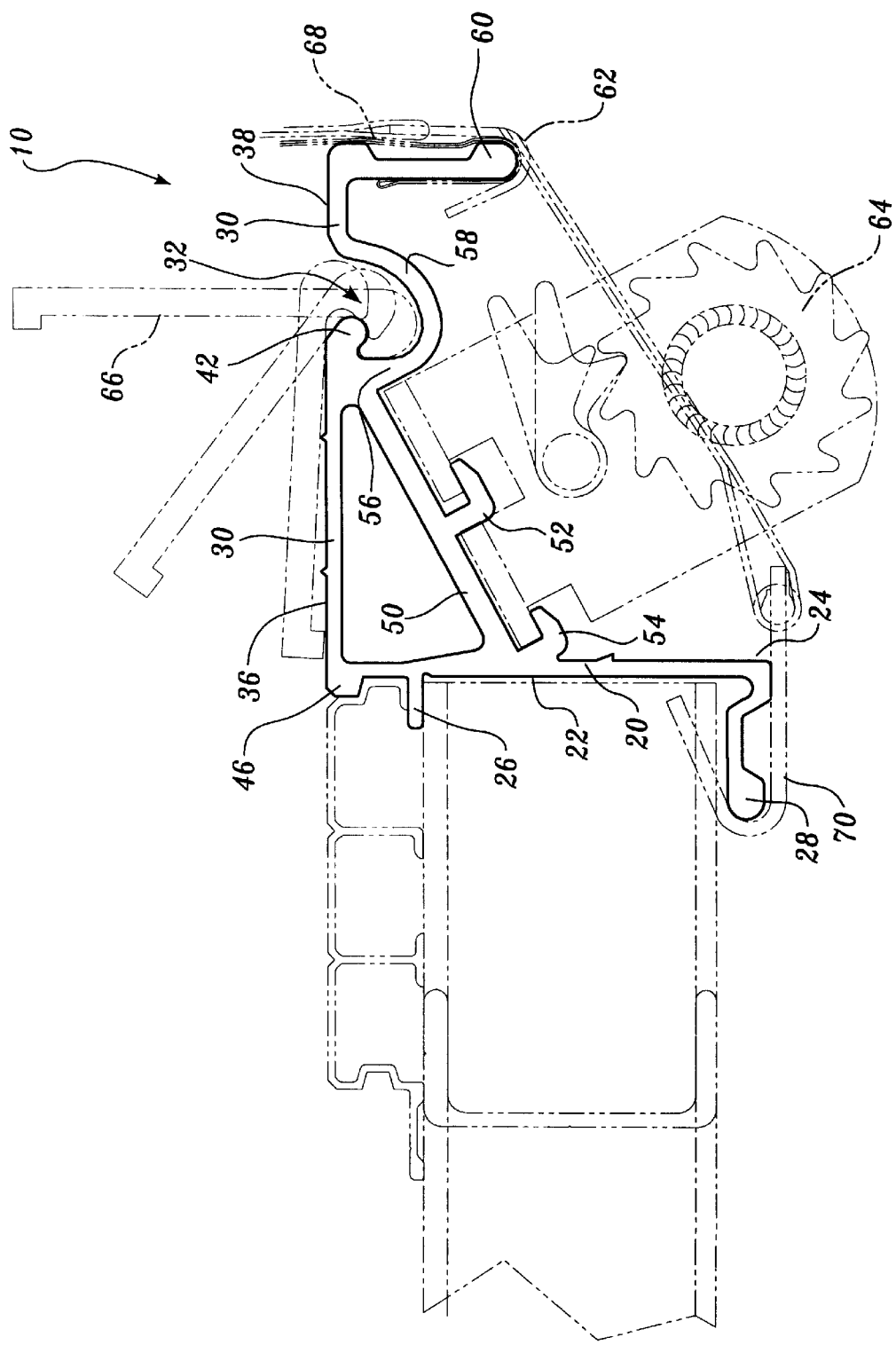
FIG. 2 illustrates a side view of the side rail apparatus of FIG. 1, shown mounted on a vehicle load support surface, and having a conventional winch, chain, and curtain mounted thereon.

FIGS. 1 and 2 illustrate a preferred embodiment of a side rail 10 constructed in accordance with the present invention for mounting on the load carrying deck of a transport vehicle to facilitate securing loads to the deck. The side rail 10 includes an upright abutment wall 20 that intersects a support surface extension 30 approximately perpendicularly. The upright abutment wall 20 has an inner surface 22 that faces the vehicle deck and an outer surface 24 that faces away from the vehicle deck. An upwardly and outwardly angling winch mount 50 extends from the outer surface 24 of the upright abutment wall 20 towards the underside of support surface extension 30. Upper and lower attachment flanges 26 and 28 project inwardly from the upright abutment wall 20 and are spaced apart and substantially parallel with each other.

The support surface extension 30 is bifurcated by a longitudinally disposed curved channel 32, creating an inner extension portion 36 and an outer extension portion 38. An outwardly disposed hook notched lip 42 is formed along the inner edge of the channel 32. An inwardly extending deck abutment notch 46 is formed at the intersection of the upright abutment wall 20 and the support surface extension 30. Upper and lower winch support hooks 52 and 54 are formed on the lower surface of the winch mount 50, and at or near the intersection of the outer surface 24 of the abutment wall 20 and the lower surface of the winch mount 50, respectively. Inner and outer connecting walls 56 and 58 are of a curved configuration and join to form the curved side walls of the channel 32. Additionally, a rubrail curtain securement flange 60 depends downwardly from the outer edge of the support surface extension 30.

As shown in FIG. 2, the upright abutment wall 20 and the upper and lower attachment flanges 26 and 28 collectively form the mounting portion of the side rail 10. Specifically, the inner surface 22 of the upright abutment wall 20 abuts against the edge of the vehicle cross members, while the upper and lower attachment flanges 26 and 28 respectively engage the top and bottom surface of the vehicle deck. Since the upper and lower attachment flanges 26 and 28 and the intervening inner surface 22 of the upright abutment wall 20 form a horizontal U-shaped configuration, this mounting portion can be slid inwardly onto the edge of the vehicle cross members into a securely engaged mounted position. The flange 28 is of sufficient strength to attach a load securement strap and hook 70 on a side rail opposite the slidable winch. The outer surface 24 is sized to accept conspicuous striping required by federal law. Further, the deck abutment notch 46, located at the top of the inner surface 22 on the upper abutment wall 20, also acts to correspondingly engage with the support surface of the vehicle deck. The deck abutment notch 46 can be configured to correspondingly mate with a wide variety of deck arrangements.

When the side rail 10 is mounted on the edge of a vehicle deck, the support surface extension 30 projects approximately horizontally outward from the original vehicle support surface and preferably is substantially coplanar with the vehicle support surface. The longitudinally disposed bifurcating channel 32 which divides the extension 30 into an inner extension portion 36 and an outer extension portion 38 is integrally formed in the extension portion 30. The curved sidewalls of bifurcating channel 32 are formed by the inner connecting curved wall 56 and the outer connecting curved wall 58. Additionally, the inner lip of the channel 32 projects outwardly to form a hook notched lip 42 that angles downwardly into the channel 32. The notched lip 42 functions as a chain tie-down securing location.

The winch mount 50 extends upwardly and outwardly from the outer surface 24 of the upright abutment wall 20 towards the lower surface of the support surface extension 30 to which the winch mount connects at or near the intersection of the inner connecting wall 56 and the inner portion 36. As previously stated, the upper/outer and lower/inner winch support hooks 52 and 54 are formed on the lower surface of the winch mount 50, and at or near the intersection of the outer surface 24 and the lower surface of the winch mount 50, respectively. The winch support hooks 52 and 54 extend upwardly and outwardly in a direction substantially parallel with that of the winch mount 50. This configuration of the winch support hooks 52 and 54, allows a slidable winch 64 with correspondingly shaped matable feet to slidably mount onto the winch mount 50. Since the winch mount 50 is diagonally disposed upwardly and outwardly, the slidable winch 64 mounts angling outwardly, and thus does not depend downwardly as far as it would if mounted to a horizontal surface.

Figure 3:
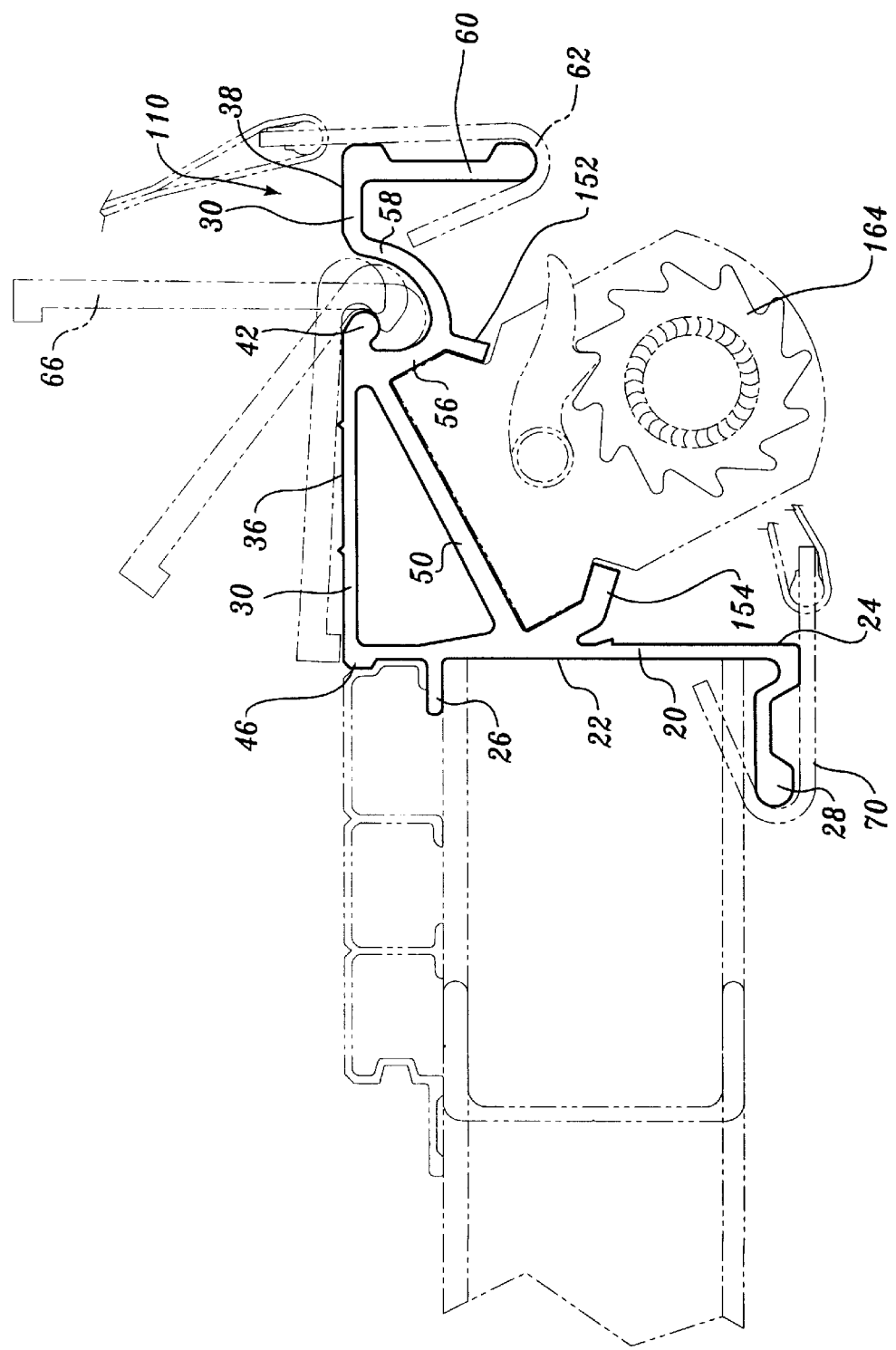
FIG. 3 illustrates a side view of an alternate embodiment side rail apparatus of the present invention, shown having a conventional winch, chain, and curtain mounted thereon.

In another preferred embodiment side rail 110, as shown in FIG. 3, the upwardly and outwardly disposed winch support hooks 52 and 54 of side rail 10 are replaced by diagonally converging winch support hooks 152 and 154 for mounting a slidable winch 164 that has a different mounting base configuration. In this preferred embodiment side rail 110, diagonally converging winch support hook 152 is located on the lower side of the curved channel 32. All other aspects of the preferred embodiment side rail 110 are the same as those of the side rail 10. Other shapes of support hooks could also be employed, depending on the particular shape of the matable feet on the specific winch, without departing from the scope of the present invention. Specifically, different configurations of support hooks can provide different benefits. For example, in the embodiments described above, side rail 10 has the advantage of being lighter in weight, while side rail 110 provides superior performance in ice and snow, and on gravel roads.

Referring again to FIG. 2, a curtain securement flange 60 depends downwardly from the outer edge of the support surface extension 30, specifically from the outer edge of the outer extension portion 38. The flange 60 serves as a rubrail to protect the side of the trailer against accidental damage from loading and unloading, as well as for tarping and curtain securement. A curtain 68 can be secured to the flange 60 by engaging a matable U-shaped curtain fastener 62 over the securement flange 60, thus locking the curtain 68 therebetween. Some users may also attach a load strap to the flange.

Side rails 10 constructed in accordance with the present invention, are typically extruded and then cut into individual side rails of desirable length. In one exemplary embodiment of the present invention, a side rail 10 is cut to be approximately six to eight inches long and is designed to support a single slidable winch 64. However, side rails 10 could be formed of numerous other lengths including the full length of the body or trailer, and thus could be capable of supporting a plurality of slidable winches 64, without departing from the scope of the present invention. Preferably, the winches are slidable along the entire length of the vehicle to secure different load configurations. Using slidable winches allows a fewer number of winches to be utilized to secure a payload; thus, reducing weight and cost.

In the exemplary embodiments shown in FIGS. 2 and 3, the angle formed between the downwardly and outwardly disposed slidable winch 64 and 164, and the upright abutment wall 20, is approximately 24 degrees. This acute angle may vary substantially ranging from approximately 15 degrees to approximately 60 degrees depending on (1) the amount of clearance needed from the vehicle wheels, (2) the amount that the vehicle width can be extended, and (3) the amount of torquing leverage required from the winch. A side rail 10 constructed in accordance with the present invention may mount the corresponding winch within the afore described angle range without departing from the scope of the present invention.

The side rail 10 of the present invention provides many benefits and overcomes many disadvantages related to conventional vehicle mounting equipment. One of the advantages of the side rail 10 is that the location and upward angulation of the winch mount 50 allows a slidable winch 64 to be mounted high enough to clear the tires of the vehicle trailer while still maintaining a low center of gravity, desirable leverage angles, and width and height restrictions. The side rail 10 allows winches to slide past or be positioned over both the truck tires and trailer tires, while keeping the deck and cargo center of gravity low.

A further advantage of the side rail 10 is that it integrally contains both a chain hook notched lip 42 for selectively mounting a chain hook 66 to chain-down flatbed loads, a rubrail curtain securement flange 60 for securing and sealing tarps and side curtains 68 to the vehicle deck, and a load securement strap and hook 70 for securing the vehicle pay load via a slidable winch on the opposite side of the vehicle. Multiple devices have been required when utilizing conventional equipment to accomplish these above-stated functions. Finally, since the side rail 10 contains a support surface extension 30 that provides functional support surface width, the original support surface deck of the transport vehicle can utilize shorter cross members and still maintain the same total width, thus achieving advantageous weight savings.

The present invention has been described in relation to two preferred embodiments. One of ordinary skill, after reading the foregoing specification, may be able to effect various other changes, alterations, and substitutions or equivalence thereof without departing from the concepts disclosed. It is therefore intended that the scope of the letters patent granted hereon be limited only by the definitions contained in the appended claims and equivalence thereof.

The embodiments of the invention in which an exclusive property or privilege is claimed are defined as follows:

1. A side rail apparatus for mounting on a vehicle having a load carrying deck with a support surface and facilitating the securement of a load to the support surface, the apparatus comprising:
   a support surface extension configured to form an additional vehicle load support surface;
   a mounting portion connected to the support surface extension and configured to mate with the deck;
   a chain securement tie-down in the shape of a hook notched lip outwardly disposed with respect to the load carrying deck, wherein the hook notched lip is integrally formed in the support surface extension; and
   a winch mount secured to at least one of the support surface extension and the mounting portion, the winch mount disposed at an angular orientation relative to the mounting portion and having portions engageable with a winch type device to mount the winch type device at an angle relative to the mounting portion.

2. The apparatus of claim 1, wherein the angle ranges from 15 degrees to 60 degrees.

3. A side rail apparatus for mounting on a vehicle having a load carrying deck with a support surface and facilitating the securement of a load to the support surface, the apparatus comprising:
   a support surface extension configured to form an additional vehicle load support surface;
   a mounting portion connected to the support surface extension and configured to mate with the deck;
   a chain securement tie-down configured in the shape of a hook notched lip, wherein the hook notched lip is integrally formed in the support surface extension;
   a curtain securement tie-down configured in the shape of a downwardly depending flange extending from an outside edge of the support surface extension; and
   a winch mount secured to at least one of the support surface extension and the mounting portion and having portions engageable with a winch type device to mount the winch type device to the mounting portion.

4. The apparatus of claim 1, further comprising a curtain securement tie-down in the shape of a flange that depends downwardly from the support surface extension, wherein said curtain securement tie-down is configured to be matable with a correspondingly shaped curtain fastener, whereby a curtain type member can be selectively attached to the curtain securement tie-down.

5. The apparatus of claim 1, further comprising a curtain securement tie-down in the shape of a flange that depends downwardly from an outside edge of the support surface extension and is integrally built into the support surface extension.

6. The apparatus of claim 1, wherein the support surface extension is approximately coplanar with the deck support surface.

7. The apparatus of claim 1, wherein the mounting portion comprises an upright abutment wall, and upper and lower support surface attachment flanges projecting from the abutment wall in spaced relationship to each other.

8. The apparatus of claim 7, wherein the upright abutment wall, and the upper and lower support surface attachment flanges are shaped and sized to mount on an edge of the load carrying deck.

9. The apparatus of claim 1, wherein the mounting portion is positionally adjustable along the edge of the load carrying deck.

10. The apparatus of claim 1, wherein the winch mount is secured to the support surface extension and the mounting portion.

11. The apparatus of claim 10, wherein the winch mount diagonally intersects the support surface extension and the mounting portion.

12. The apparatus of claim 1, wherein the winch mount further comprises at least one winch support hook that is shaped and sized to engage a winch type device.

13. The apparatus of claim 1, wherein the winch mount is configured to mount a winch type device in a plane perpendicular to a plane defined by the mounting portion.

14. The apparatus of claim 12, wherein the at least one winch support hook comprises two concavely converging support hooks.

15. The apparatus of claim 12, wherein the at least one winch support hook is configured to slidably receive and support at least one slidably engageable winch type device.

16. A side rail apparatus for mounting on a vehicle having a load carrying deck with a support surface and facilitating the securement of a load to the support surface, the apparatus comprising:
   an upper portion;
   a mounting portion operatively connected to the upper portion and configured to mate with the deck;
   a chain securement tie-down configured in the shape of a hook notched lip, wherein the hook notched lip is integrally formed in the upper portion;
   a curtain securement tie-down configured in the shape of a downwardly depending flange extending from the upper portion; and
   a winch mount secured to at least one of the upper portion and the mounting portion, the winch mount disposed at an angular orientation relative to the mounting portion and having portions engageable with a winch type device to mount the winch type device at an acute angle relative to the mounting portion.

17. The apparatus of claim 16, wherein the mounting portion is positionally adjustable along the edge of the load carrying deck.

18. The apparatus of claim 16, wherein the winch mount is configured to mount a winch type device in a plane perpendicular to a plane defined by the mounting portion.

19. The apparatus of claim 16, wherein the acute angle ranges from 15 degrees to 60 degrees.

20. The apparatus of claim 16, wherein the curtain securement tie-down depends downwardly from an outside edge of the upper portion and is integrally built into the upper portion.

21. The apparatus of claim 16, wherein the mounting portion comprises an upright abutment wall, and upper and lower support surface attachment flanges projecting from the abutment wall in spaced relationship to each other.

22. The apparatus of claim 21, wherein the upright abutment wall, and upper and lower support surface attachment flanges are shaped and sized to mount on an edge of the load carrying deck.

23. The apparatus of claim 16, wherein the winch mount further comprises at least one winch support hook that is shaped and sized to engage a winch type device.

24. The apparatus of claim 16, wherein the winch mount is secured to the upper portion and the mounting portion.

25. The apparatus of claim 24, wherein the winch mount diagonally intersects the upper portion and the mounting portion.

26. The apparatus of claim 23, wherein the at least one winch support hook comprises two concavely converging support hooks.

27. The apparatus of claim 23, wherein the at least one winch support hook is configured to slidably receive and support a slidably engageable winch type device.

* * * * *